(12) United States Patent
Han

(10) Patent No.: US 11,014,530 B2
(45) Date of Patent: May 25, 2021

(54) SAFETY BELT RETRACTOR WITH A LOAD LIMITING DEVICE AND VEHICLE HAVING THE SAME

(71) Applicant: TRW AUTOMOTIVE TECHNOLOGIES (SHANGHAI) CO., LTD., Shanghai (CN)

(72) Inventor: Yong Han, Shanghai (CN)

(73) Assignee: TRW AUTOMOTIVE TECHNOLOGIES (SHANGHAI) CO. LTD, Shanghai (CN)

( * ) Notice: Subject to any disclaimer, the term of this patent is extended or adjusted under 35 U.S.C. 154(b) by 232 days.

(21) Appl. No.: 16/083,937

(22) PCT Filed: Mar. 22, 2017

(86) PCT No.: PCT/CN2017/077678
§ 371 (c)(1),
(2) Date: Sep. 11, 2018

(87) PCT Pub. No.: WO2017/162167
PCT Pub. Date: Sep. 28, 2017

(65) Prior Publication Data
US 2020/0290560 A1    Sep. 17, 2020

(30) Foreign Application Priority Data
Mar. 23, 2016 (CN) .......................... 201610167542.7

(51) Int. Cl.
*B60R 22/46*    (2006.01)
*B60R 22/34*    (2006.01)
*B60R 22/28*    (2006.01)

(52) U.S. Cl.
CPC ...... *B60R 22/3413* (2013.01); *B60R 22/4676* (2013.01); *B60R 2022/287* (2013.01);
(Continued)

(58) Field of Classification Search
CPC . B60R 22/46; B60R 22/3413; B60R 22/4676; B60R 2022/287; B60R 2022/288; B60R 2022/289
See application file for complete search history.

(56) References Cited

U.S. PATENT DOCUMENTS 5,607,118 A    3/1997 Dybro et al.
5,626,306 A    5/1997 Miller, III et al.
(Continued)

FOREIGN PATENT DOCUMENTS

DE    19640842    4/1998

*Primary Examiner* — Sang K Kim
(74) *Attorney, Agent, or Firm* — Tarolli, Sundheim, Covell & Tummino LLP

(57) ABSTRACT

A safety belt retractor having a load limiting device is provided. The load limiting device comprises: a hollow spool (1) on which a webbing can be wound, a locking disk (2) having a flange (21) and a sleeve (22) attached thereto, and a torsion bar (3); the locking disk (2) can be mounted with the flange (21) on an end of the spool (1) and can extend with the sleeve (22) into a hollow chamber of the spool (1), and the spool (1) is rotatable in relation to the locking disk (2); the torsion bar (3) can be arranged in the hollow chamber of the spool (1) and is fixed on the spool (1) and on the locking disk (2) in a rotationally secured manner. The load limiting device further comprises a load limiting ring (5) with a thread (51) on the inner circumference, the load limiting ring (5) can be rotated around the sleeve (22) with the rotation of the spool (1), and the sleeve (22) is provided on its outer circumference with an engaging section (221) and with a resistance part for applying a resistance to the load limiting ring (5), the sleeve (22) having in the engaging section (221) a mating thread which matches with the thread (51) of the load limiting ring (5) and the resistance part being arranged downstream of the engaging section (221) in the axial displacement direction of the load limiting ring (5).

12 Claims, 5 Drawing Sheets

(52) U.S. Cl.
CPC ... *B60R 2022/288* (2013.01); *B60R 2022/289* (2013.01); *B60R 2022/3402* (2013.01)

(56) References Cited

U.S. PATENT DOCUMENTS

| | | | | |
|---|---|---|---|---|
| 5,938,135 | A * | 8/1999 | Sasaki | B60R 22/4676 242/374 |
| 6,382,548 | B1 * | 5/2002 | Nishizawa | B60R 22/3413 242/379.1 |
| 2004/0206844 | A1 * | 10/2004 | Shiotani | B60R 22/3413 242/379.1 |
| 2005/0061904 | A1 * | 3/2005 | Inuzuka | B60R 22/3413 242/379.1 |
| 2006/0131456 | A1 * | 6/2006 | Romero | B60R 22/3413 242/382 |
| 2007/0001443 | A1 * | 1/2007 | Yanagi | B60R 22/46 280/806 |
| 2007/0262186 | A1 | 11/2007 | Hiramatsu | |
| 2008/0029633 | A1 * | 2/2008 | Hiramatsu | B60R 22/3413 242/379.1 |
| 2008/0203807 | A1 * | 8/2008 | Yoshioka | B60R 22/3413 297/478 |
| 2015/0224960 | A1 | 8/2015 | Hertag et al. | |

* cited by examiner

SAFETY BELT RETRACTOR WITH A LOAD LIMITING DEVICE AND VEHICLE HAVING THE SAME

RELATED APPLICATIONS

This application corresponds to PCT/CN2017/077678, filed Mar. 22, 2017, which corresponds to Chinese Application No. 201610167542.7, filed Mar. 23, 2016, the subject matter of which are incorporated herein by reference in their entirety.

TECHNICAL FIELD

The present disclosure relates to a safety belt retractor with a load limiting device and a vehicle having the same.

BACKGROUND ART

A safety belt retractor can comprise a safety belt tensioner and a load limiting device.

In case of collisions of a vehicle, first of all, the safety belt tensioner can tension the safety belt to eliminate the marginal space between the safety belt and the human body; and then, with the forward movement of the human body the safety belt is pulled out and then the load limiting device can reduce the tensioning strength of the safety belt so as to reduce the force applied to the passenger.

Therefore, the load limiting device of the safety belt retractor is used for providing a certain limited force to the human body. The conventional load limiting devices of the safety belt retractor employ a torsion bar. When the load reaches a certain level, the torsion bar begins to be twisted, so that the safety belt is pulled out and thereby is released, realizing a load limiting function of the safety belt. However, usually the force exerted by the load limiting device can only remain constant, i.e. keep at a basic load limiting value as defined by the torsion bar.

Nevertheless, depending on the particular types of vehicles and on the mating manners between the safety belt retractor and the airbag, it is sometimes further desired that the limited force exerted by the load limiting device of the safety belt retractor changes. For example, the load limiting value can increase or decrease, and in special cases can even become infinite.

To this end, it is currently proposed to provide an additional limited force by steel wires or blades or the like, so as to vary the limited force provided by the load limiting device of the safety belt retractor. However, it is difficult to accurately control the load limiting value provided by the load limiting devices of these prior solutions. Furthermore, these prior solutions has a space limitation, that is, when the load limiting value of the load limiting device changes, the rotation angle of the spool can only maximally reach about 300 degree, and thus the pull-out amount of the webbing wound around the spool is limited. Therefore, the safety belt retractors of these prior solutions have a great limitation when in use.

CONTENT OF THE DISCLOSURE

Therefore, the technical objective of the present disclosure lies in providing a safety belt retractor with a load limiting device, which is applicable to a wide variety of different types of vehicles. In particular, the safety belt retractor according to the present disclosure can be accurately controlled in terms of the load limiting value of its load limiting device and can be designed in a larger range in terms of the pull-out amount of its webbing. Thus, the safety belt retractor according to the disclosure can be more widely used.

In accordance with one aspect of the present disclosure, a safety belt retractor with a load limiting device is provided, wherein the load limiting device comprises: a hollow spool around which a webbing can be wound, a locking disk having a flange and a sleeve attached thereto, and a torsion bar, wherein the locking disk can be mounted with the flange on an end of the spool and can extend with the sleeve into a hollow chamber of the spool, and the spool is rotatable in relation to the locking disk, wherein the torsion bar can be arranged in the hollow chamber of the spool and is fixed both on the spool and on the locking disk in a rotationally secured manner. According to the present disclosure, the load limiting device further comprises a load limiting ring with a thread on the inner circumference, which load limiting ring can be rotated around the sleeve with the rotation of the spool, and the sleeve is provided on its outer circumference with an engaging section and with a resistance part for applying a resistance to the load limiting ring, wherein the sleeve has in the engaging section a mating thread which matches with the thread of the load limiting ring, and the resistance part is arranged downstream of the engaging section in the axial displacement direction of the load limiting ring. Accordingly, through the mating action of the engaging section and the resistance part of the sleeve with the load limiting ring, the load limiting valve provided by the load limiting device can be varied depending on needs, such as increasing, reducing or suddenly becoming infinite, so that the safety belt retractor with the load limiting device according to the present disclosure is applicable to a wide variety of different types of vehicles. Moreover, the load limiting value provided by the load limiting device with the load limiting device can be varied at a specific time and/or be varied for a specific duration and/or be changed by a specific value, and thus the load limiting value provided by the load limiting device can be accurately controlled. Furthermore, the safety belt retractor with the load limiting device can be designed according to needs in a larger range in terms of the pull-out amount of its webbing. Thus, the safety belt retractor according to the disclosure can be more widely used.

According to one preferred embodiment of the present disclosure, the sleeve can be provided on its outer circumference with a cutting section as a first resistance part, and the outer diameter of the sleeve in the cutting section is larger than the nominal diameter of the thread of the load limiting ring. Accordingly, in the cutting section of the sleeve, the load limiting ring cuts the sleeve and thereby produces a cutting force, so that the sleeve produces a resistance corresponding to the cutting force against the displacement of the load limiting ring. That is to say, on the basis of the basic load limiting value as defined by the torsion bar, the load limiting value provided by the load limiting device is increased by an additional load limiting value corresponding to the cutting force. More preferably, the sleeve can have a guiding thread in the cutting section, through which guiding thread the load limiting ring can be guided. Accordingly, the load limiting ring will not deviate from its expected cutting path when cutting the sleeve.

According to one preferred embodiment of the present disclosure, the sleeve can be provided on its outer circumference with a stopping surface, which stopping surface is formed by a step made on the sleeve and is arranged downstream of the cutting section in the axial displacement direction of the load limiting ring. Accordingly, a stop can be provided to the load limiting ring by the stopping surface of the sleeve, so as to well position the load limiting ring.

According to one preferred embodiment of the present disclosure, the sleeve is provided on its outer circumference with a separating section, which separating section is arranged directly downstream of the cutting section in the axial displacement direction of the load limiting ring, and the outer diameter of the sleeve in the separating section is no larger than the nominal diameter of the thread of the load limiting ring. Accordingly, in the separating section of the sleeve, the load limiting ring idles around the sleeve and is no longer displaced axially, so as to well position the load limiting ring.

According to one preferred embodiment of the present disclosure, the sleeve can be provided on its outer circumference with a stopping surface as a second resistance part, which stopping surface is formed by a step made on the sleeve. Accordingly, the load limiting ring can suddenly rest on the stopping surface by means of the stopping surface of the sleeve, so as to force the spool to stop rotating. That is to say, the load limiting value provided by the load limiting device suddenly becomes infinite to force the webbing to be no longer pulled out, thereby preventing the human body from a further forward moving.

According to one preferred embodiment of the present disclosure, the thread of the load limiting ring extends in a discontinuous manner in the circumferential direction and thereby forms at least one threaded section, and preferably the thread of the load limiting ring is divided into a plurality of threaded sections in an equally spaced manner in the circumferential direction. Accordingly, the load limiting ring functions as a screw die, and the chips produced when the load limiting ring cuts the sleeve can remain in the gaps serving as clearance holes between the threaded sections, thereby preventing the load limiting ring from being retained on the sleeve.

According to one preferred embodiment of the present disclosure, a slider extending in the axial direction can be provided on the outer circumference of the load limiting ring, and a sliding slot extending in the axial direction can be provided on the inner side of the spool, so as to mate with the slider, and thereby the load limiting ring can be displaced in relation to the spool in the axial direction, while being mounted on the spool in a rotationally secured manner. Accordingly, the load limiting ring can be rotated in a simple manner around the sleeve with the rotation of the spool.

According to one preferred embodiment of the present disclosure, the flange of the locking disk and the sleeve are integrated. Accordingly, the strength of the sleeve can be increased.

According to one preferred embodiment of the present disclosure, the load limiting device further comprises a clip for preventing the spool from bouncing axially in relation to the locking disk. More preferably, the clip is positioned in the assembled state between the spool and the locking disk by means of a mounting hole in the spool and a positioning slot on the locking disk.

According to one preferred embodiment of the present disclosure, the safety belt retractor further comprises a safety belt tensioner. Accordingly, the marginal space between the human body and the safety belt can be eliminated in case of collisions of a vehicle.

In accordance with the other aspect of the present disclosure, a vehicle is provided, which comprises a safety belt retractor as above-mentioned.

BRIEF DESCRIPTION OF THE DRAWINGS

Below is a detailed explanation of the present disclosure referring to the embodiments illustrated in the drawings, among which drawings.

DETAILED DESCRIPTION OF THE EMBODIMENTS

Figure 1A:
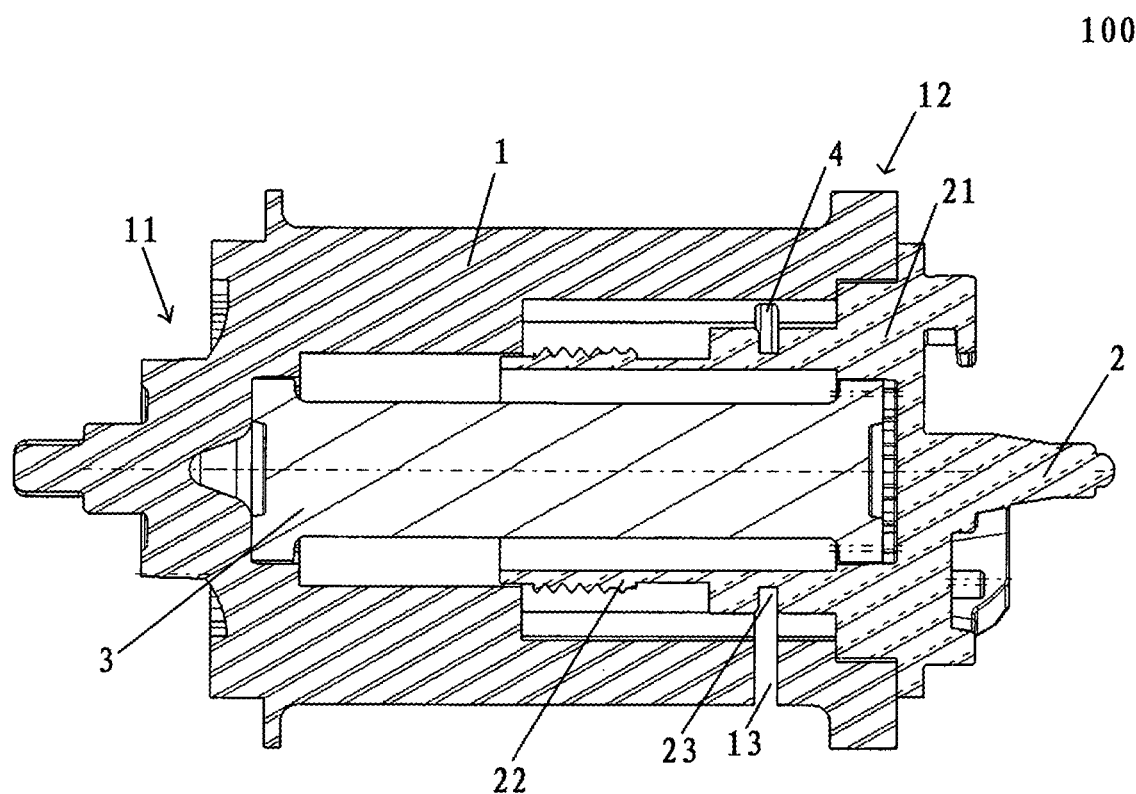
FIG. 1A illustrates a load limiting device of a safety belt retractor according to the first embodiment of the present disclosure.

FIG. 1A illustrates a load limiting device 100 of a safety belt retractor according to the first embodiment of the present disclosure. The load limiting device 100 comprises a spool 1, a locking disk 2 and a torsion bar 3. The spool 1 can be wound by a webbing around its outer circumference. The spool 1 is configured as hollow, with one end thereof configured as a closed end 11 and the other end thereof configured as an open end 12. The locking disk 2 has a flange 21 and a sleeve 22 fixed to the flange 21. In the assembled state, the locking disk 2 is mounted with the flange 21 on the open end 12 of the spool 1 and extends with the sleeve 22 into the hollow chamber of the spool 1. In the assembled state, the torsion bar 3 is located in the hollow chamber of the spool 1, and one end of the torsion bar 3 is fixed in a rotationally secured manner on the locking disk 2, preferably on the inner side of the flange 21 of the locking disk 2, and the other end of the torsion bar 3 is fixed in a rotationally secured manner on the closed end 11, opposite to the open end 12 on which the flange 21 is mounted, of the spool 1. In addition, the load limiting device 100 can further comprise a clip 4 for preventing the spool 1 from bouncing axially in relation to the locking disk 2. For this purpose, the clip 4 can be mounted and positioned by means of a mounting hole 13 in the spool 1 and a positioning slot 23 on the locking disk 2, and in the assembled state can be arranged between the spool 1 and the locking disk 2.

Figure 1B:
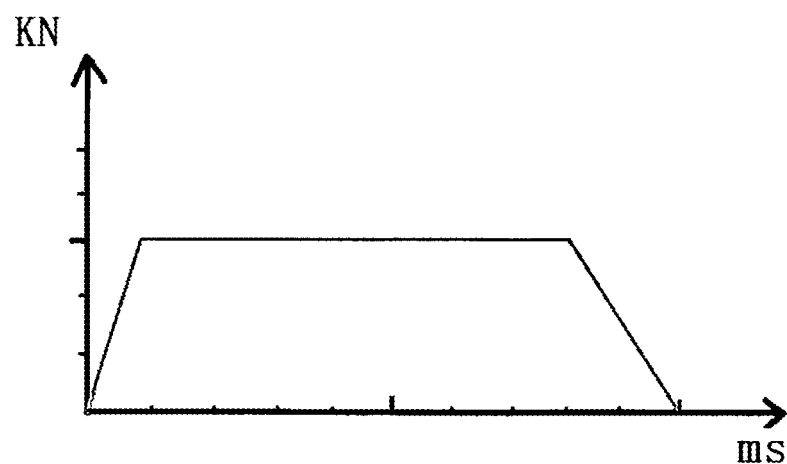
FIG. 1B illustrates a variation curve of the load limiting value of the load limiting device of FIG. 1A.

In the embodiment as illustrated in FIG. 1A, when the load applied to the spool 1 reaches a basic load limiting value, e.g. 3KN, as defined by the torsion bar 3, since the locking disk 2 is fixedly connected to the vehicle, the spool 1 can be rotated around the locking disk 2 which is stationary in relation to the vehicle. The end, fixed on the spool 1, of the torsion bar 3 is rotated with the spool 1, while the end, fixed on the locking disk 2, of the torsion bar 3 also keeps stationary in relation to the vehicle. When the airbag is about to be unfolded or after it is unfolded, e.g. after 70 ms, the torsion bar 3 can fail. A variation curve of the load limiting value exerted by the load limiting device 100 is illustrated in FIG. 1B. It can be known from this figure that the load limiting value exerted by the load limiting device 100 remains constant during the operating process of the load limiting device 100, i.e. keeps at the basic load limiting value as defined by the torsion bar 3.

Figure 2A:
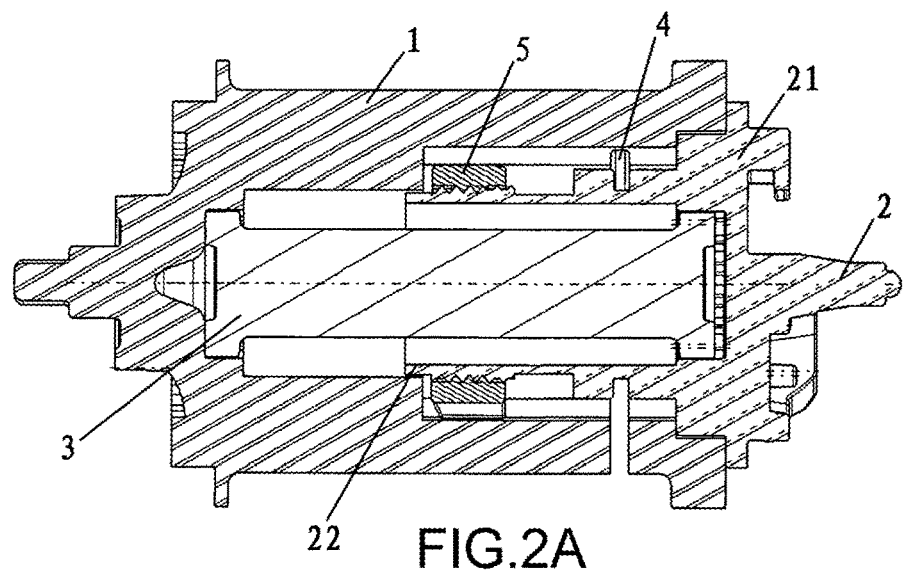
FIG. 2A illustrates a load limiting device of a safety belt retractor according to the second embodiment of the present disclosure.

FIG. 2A illustrates a load limiting device 200 of a safety belt retractor according to the second embodiment of the present disclosure. In FIG. 2A, the components that are identical with or corresponding to the components in FIG. 1A are indicated by the same reference signs as those in FIG. 1A and will be not repeated again. The load limiting device 200 differs from the load limiting device 100 in FIG. 1A in that the load limiting device 200 further comprises a load limiting ring 5.

Figure 5:
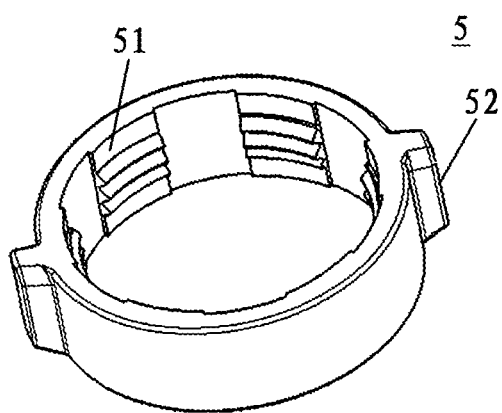
FIG. 5 illustrates a perspective view of the load limiting ring of the load limiting device.

As illustrated in FIG. 5, the load limiting ring 5 has a thread 51 on the inner circumference, which thread extends in a discontinuous manner in the circumferential direction and thereby forms at least one threaded section. Preferably, the thread 51 of the load limiting ring 5 is divided into a plurality of threaded sections in an equally spaced manner in the circumferential direction. The load limiting ring 5 can function as a screw die and cut the sleeve 22, and the gap or gaps between the threaded sections can function as a clearance hole or clearance holes.

In addition, the load limiting ring 5 has at least one, preferably two, slider 52 on the outer circumference, which slider(s) can mate with the sliding slot(s) (not shown) arranged on the inner side of the spool 1 and extending in the axial direction, thereby the load limiting ring 5 can be displaced in relation to the spool 1 in the axial direction, while the load limiting ring 5 is rotationally secured in relation to the spool 1. Certainly, other fastening manners can also be used, so that the load limiting ring 5 is mounted on the spool 1 in the assembled state in a rotationally secured manner, yet it can be displaced in the axial direction.

Figure 2B:
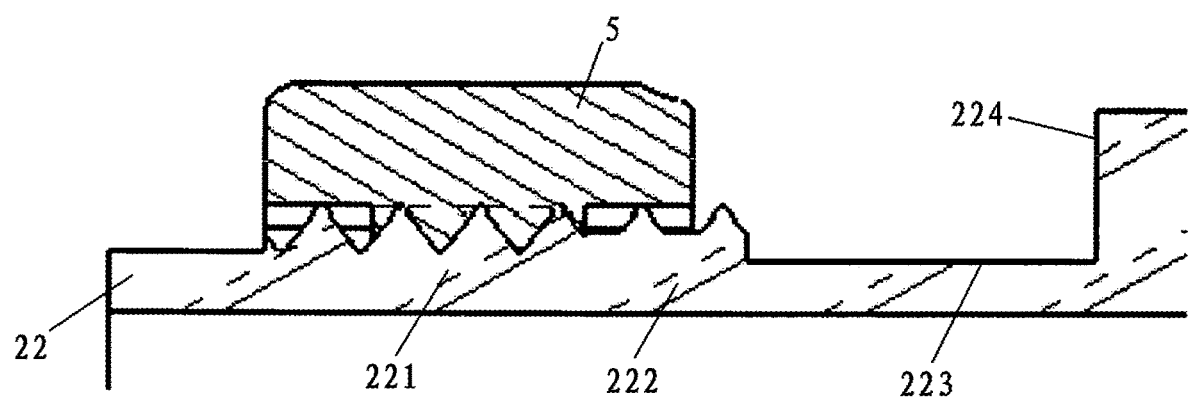
FIG. 2B illustrates an enlarged view in regions of the sleeve and the load limiting ring of FIG. 2A.

In this embodiment, in particular as illustrated in FIG. 2B, in the axial displacement direction of the load limiting ring 5, the sleeve 22 of the locking disk 2 successively comprises an engaging section 221, a cutting section 222, a separating section 223 and a stopping surface 224. In the engaging section 221, the load limiting ring 5 can be rotated around the sleeve 22 and be axially displaced in relation to the sleeve 22, wherein the sleeve 22 does not produce a resistance against the displacement of the load limiting ring 5. For this purpose, the sleeve 22 can have in the engaging section a mating thread which matches with the thread 51 of the load limiting ring 5. In the cutting section 222, the load limiting ring 5 can be rotated around the sleeve 22 and be axially displaced, and can cut the sleeve 22 by means of the thread 51 and thereby produces a cutting force, wherein the sleeve 22 produces a resistance corresponding to the cutting force against the load limiting ring 5. Therefore, the sleeve 22 can be not provided with any thread in the cutting section 222, but the outer diameter of the sleeve 22 in the cutting section 222 should be larger than the nominal diameter of the thread 51 of the load limiting ring 5. However, preferably, a guiding thread which is shallower than the mating thread in the engaging section 221 can be provided in the cutting section 222, so that the load limiting ring 5 can be guided through the guiding thread in the cutting section 222. In the separating section 223, the load limiting 5 is disengaged from the sleeve 22, and thereby the load limiting ring 5 idles around the sleeve 22 without axially displacement and there is no resistance. For this purpose, the outer diameter of the sleeve 22 in the separating section 223 is no larger than the nominal diameter of the thread 51 of the load limiting ring 5. A stopping surface 224 can be formed by a step made on the sleeve 22, and is used for stopping the load limiting ring 5, and thereby the load limiting ring 5 can rest on the stopping surface 224 of the sleeve 22. In this embodiment, the sleeve 22 can also not comprise the stopping surface 224.

Figure 2C:
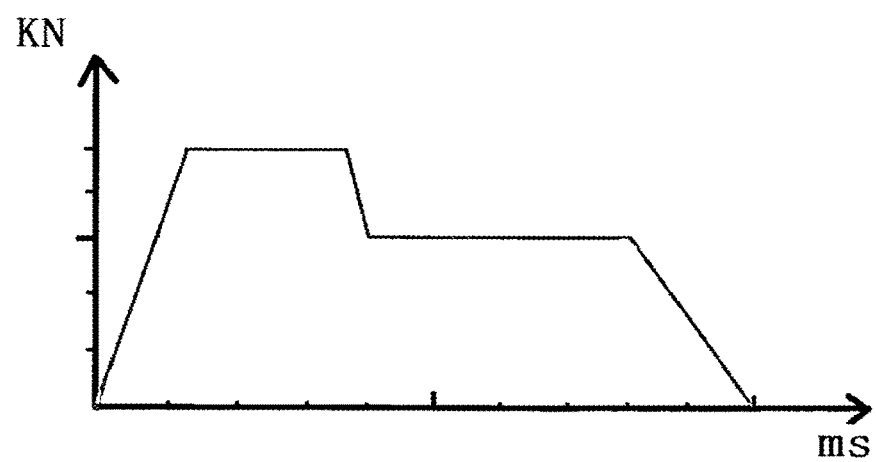
FIG. 2C illustrates a variation curve of the load limiting value of the load limiting device of FIG. 2A.

In the embodiment as illustrated in FIGS. 2A and 2B, the load limiting ring 5 is initially located in a terminal end region, adjacent to the cutting section 222, of the engaging section 221. When the load applied to the spool 1 reaches the sum of a basic load limiting value (e.g. 3KN) as defined by the torsion bar 3 and an additional load limiting value (e.g. 2KN) corresponding to the cutting force produced by the load limiting ring 5 to the sleeve 22, the spool 1 can be rotated around the locking disk 2, and the load limiting ring 5 is rotated with the spool 1 around the sleeve 22 so as to be displaced axially. When the load limiting ring 5 is displaced away from the cutting section 222 of the sleeve 22 and enters the separating section 223, the load limiting value provided by the load limiting device 200 of the safety belt retractor can decrease to the basic load limiting value as defined by the torsion bar 3, i.e. 3KN. A variation curve of the load limiting value exerted by the load limiting device 200 is illustrated in FIG. 2C. It can be known from this figure that the load limiting value exerted by the load limiting device 200 decreases in a stepwise fashion during the operating process of the load limiting device 200.

In this embodiment, the cutting section 222 of the sleeve 22 is configured as a resistance part for the load limiting ring 5. In the cutting section 222, the load limiting value provided by the load limiting device 200 is increased on the basis of the basic load limiting value as defined by the torsion bar 3 by an additional load limiting value corresponding to the cutting force. The action period and amount of the additional load limiting value can be varied depending on needs. For example, the duration of action of the additional load limiting value can be controlled by the length of extension of the cutting section 222 or preferably by the teeth number of the guiding thread of the cutting section 222, and the amount of the additional load limiting value can be controlled by the nominal diameter, the teeth number and the thread angle of the thread of the load limiting ring 5.

Figure 3A:
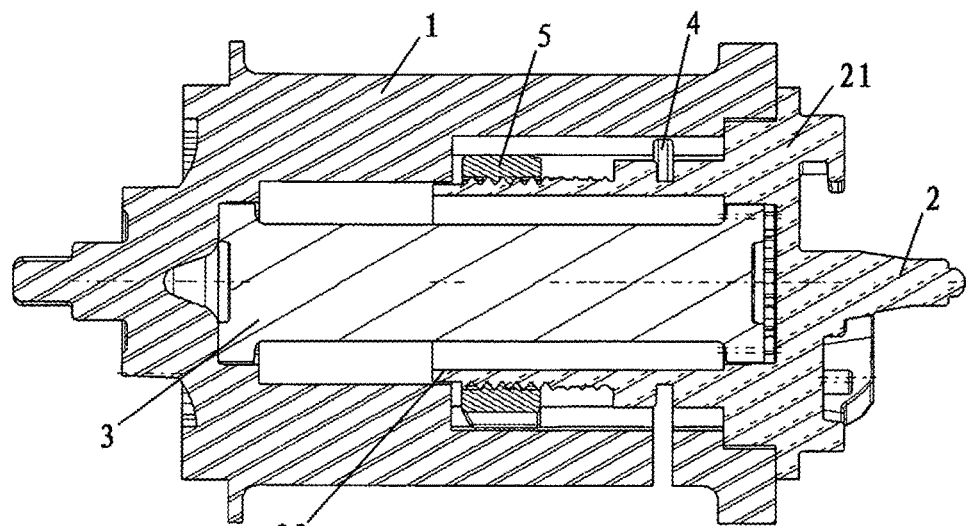
FIG. 3A illustrates a load limiting device of a safety belt retractor according to the third embodiment of the present disclosure.
Figure 3B:
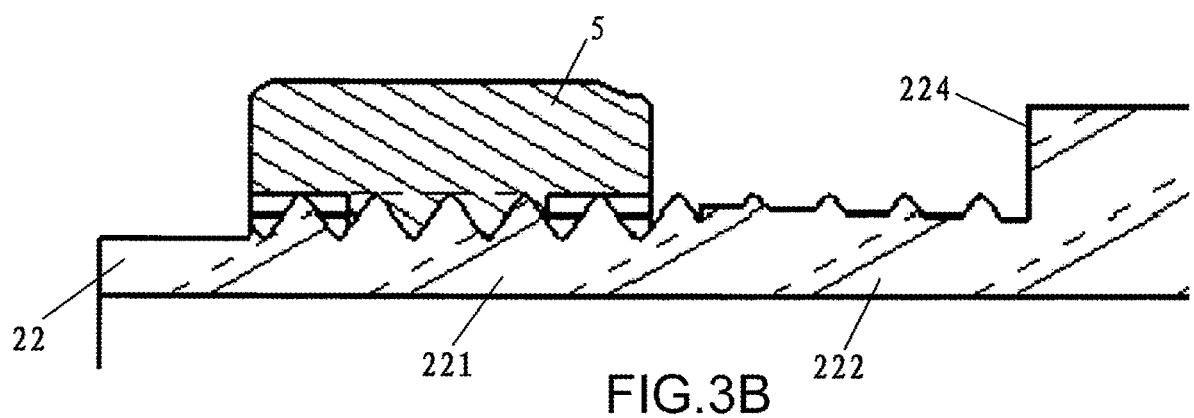
FIG. 3B illustrates an enlarged view in regions of the sleeve and the load limiting ring of FIG. 3A.

FIG. 3A illustrates a load limiting device 300 of a safety belt retractor according to the third embodiment of the present disclosure, and FIG. 3B illustrates an enlarged view in regions of the sleeve and the load limiting ring of FIG. 3A. In FIGS. 3A and 3B, the components that are identical with or corresponding to the components in FIGS. 2A and 2B are indicated by the same reference signs as those in FIGS. 2A and 2B and will be not repeated again. The load limiting device 300 differs from the load limiting device 200 in FIGS. 2A and 2B lies in the structure of the sleeve 22. As illustrated in FIG. 3B, in the axial displacement direction of the load limiting ring 5, the sleeve 22 of the locking disk 2 successively comprises an engaging section 221, a cutting section 222, and a stopping surface 224. In this embodiment, the sleeve 22 can also not comprise the stopping surface 224.

Figure 3C:
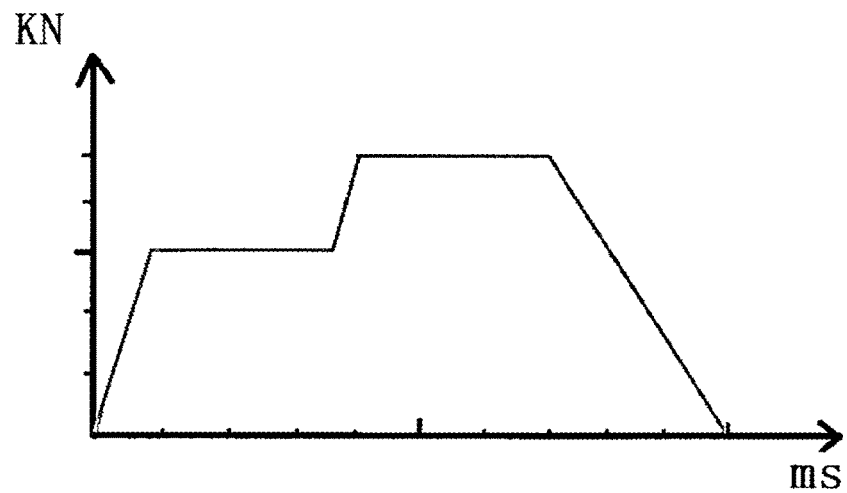
FIG. 3C illustrates a variation curve of the load limiting value of the load limiting device of FIG. 3A.

In the embodiment as illustrated in FIGS. 3A and 3B, the load limiting ring 5 can be initially located in a beginning end region of the engaging section 221. When the load applied to the spool 1 reaches the basic load limiting value (e.g. 3KN) as defined by the torsion bar 3, the spool 1 can be rotated around the locking disk 2, and the load limiting ring 5 is rotated with the spool 1 around the sleeve 22 and is displaced axially. After the load limiting ring 5 reaches the cutting section 222 of the sleeve 22, the load applied to the spool 1 needs to reach the sum of the basic load limiting value (e.g. 3KN) as defined by the torsion bar 3 and an additional load limiting value (e.g. 2KN) corresponding to the cutting force produced by the load limiting ring 5 to the sleeve 22, and only then will the load limiting ring 5 continue to be rotated around the sleeve 22 and be displaced in the axial direction until the torsion bar 3 fails. A variation curve of the load limiting value exerted by the load limiting device 300 is illustrated in FIG. 3C. It can be known from this figure that the load limiting value exerted by the load limiting device 300 increases in a stepwise fashion during the operating process of the load limiting device 300.

Similarly, in this embodiment, the cutting section 222 of the sleeve 22 is configured as a resistance part for the load limiting ring 5. In the cutting section 222, the load limiting value provided by the load limiting device 300 is increased on the basis of the basic load limiting value as defined by the torsion bar 3 by an additional load limiting value corresponding to the cutting force. The action period and the amount of the additional load limiting value can be varied depending on needs. For example, the duration of action of the additional load limiting value can be controlled by the length of extension of the cutting section 222 or preferably by the teeth number of the guiding thread of the cutting section 222, and the amount of the additional load limiting value can be controlled by the nominal diameter, the teeth number and the thread angle of the thread of the load limiting ring 5.

Figure 4A:
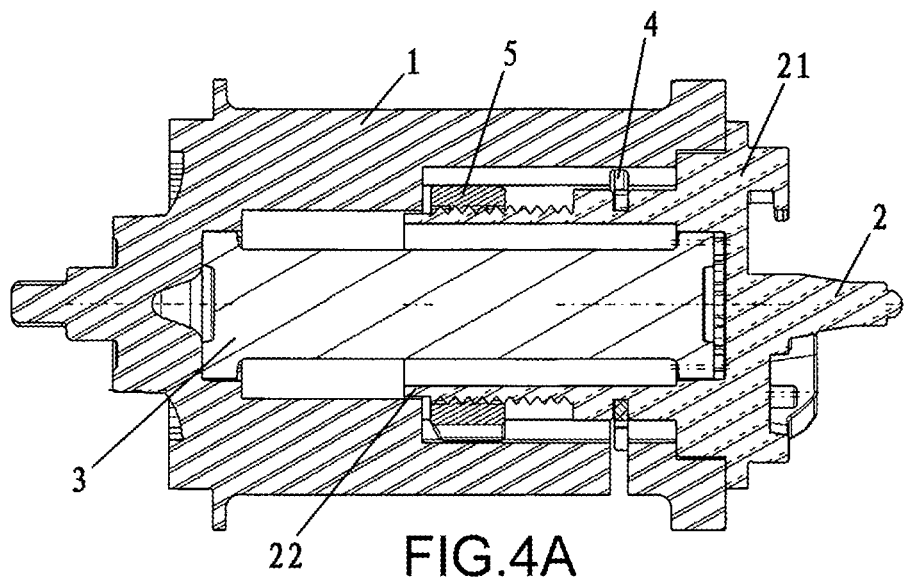
FIG. 4A illustrates a load limiting device of a safety belt retractor according to the fourth embodiment of the present disclosure.
Figure 4B:
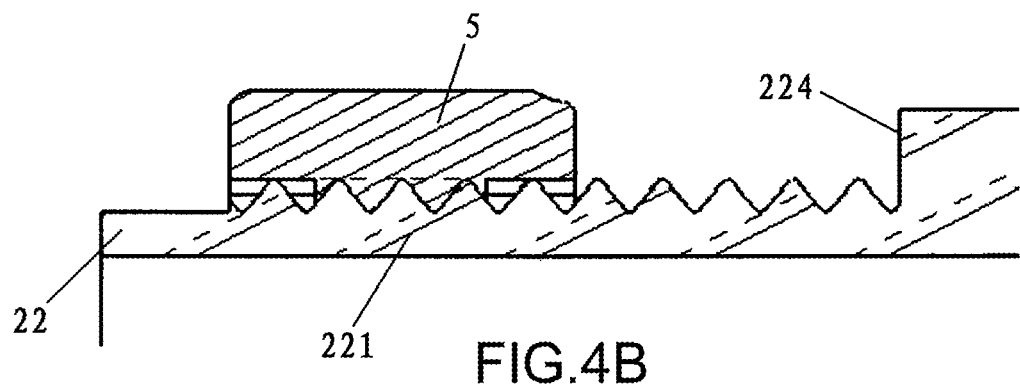
FIG. 4B illustrates an enlarged view in regions of the sleeve and the load limiting ring of FIG. 4A.

FIG. 4A illustrates a load limiting device 400 of a safety belt retractor according to the fourth embodiment of the present disclosure, and FIG. 4B illustrates an enlarged view in regions of the sleeve and the load limiting ring of FIG. 4A. In FIGS. 4A and 4B, the components that are identical with or corresponding to the components in FIGS. 2A and 2B are indicated by the same reference signs as those in FIGS. 2A and 2B and will be not repeated again. The load limiting device 400 differs from the load limiting device 200 in FIGS. 2A and 2B lies in the structure of the sleeve 22. As illustrated in FIG. 4B, in the axial displacement direction of the load limiting ring 5, the sleeve 22 of the locking disk 2 successively comprises an engaging section 221 and a stopping surface 224.

Figure 4C:
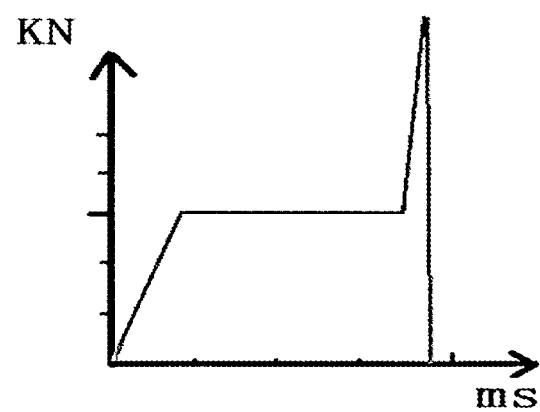
FIG. 4C illustrates a variation curve of the load limiting value of the load limiting device of FIG. 4A.

In the embodiment as illustrated in FIGS. 4A and 4B, the load limiting ring 5 can be initially located in a beginning end region of the engaging section 221. When the load applied to the spool 1 reaches the basic load limiting value (e.g. 3KN) as defined by the torsion bar 3, the spool 1 can be rotated around the locking disk 2, and the load limiting ring 5 is rotated with the spool 1 around the sleeve 22 and is displaced axially. After the load limiting ring 5 reaches the stopping surface 224 of the sleeve 22, the resistance of the sleeve 22 to the load limiting ring 5 becomes infinite, thereby causing jamming of the load limiting ring 5. Accordingly, it is impossible for the spool 1 to continue to be rotated around the locking disk 2, and thereby the webbing on the spool 1 can no longer be pulled outwardly. A variation curve of the load limiting value exerted by the load limiting device 400 is illustrated in FIG. 4C. It can be known from this figure that the load limiting value exerted by the load limiting device 400 suddenly becomes infinite during the operating process of the load limiting device 400.

In this embodiment, the stopping surface 224 of the sleeve 22 is configured as a resistance part for the sleeve 22. After the load limiting ring 5 rests on the stopping surface 224, the load limiting value exerted by the load limiting device 400 suddenly becomes infinite, thereby forcing the spool 1 to stop rotating.

It can be known from the aforesaid contents that, an additional load limiting value can be provided by means of the arrangement of the load limiting ring 5 and the resistance part configured on the sleeve, i.e. the cutting section 222 and/or the stopping surface 224, for the load limiting ring, and thereby the load limiting value provided by the load limiting device becomes equal to the sum of the basic load limiting value provided by the torsion bar and the additional load limiting value provided by the resistance part. Through the mating action of the load limiting ring 5 with the sleeve 22, the load limiting valve provided by the load limiting device, e.g. the specific changing time, the specific changing duration, the specific changing amount of the load limiting value and so on, can be accurately controlled. Furthermore, the safety belt retractor with the load limiting device can be designed in a larger range in terms of the pull-out amount of its webbing. Accordingly, the safety belt retractor according to the present disclosure not only is applicable to a wide variety of different types of vehicles, but also can be more widely used.

Although a description is made to the present disclosure through examples and by referring to particular embodiments, yet it can be understood that modifications and/or improvements can be made without departing from the scope of the enclosed claims.

In the case where the integrals or elements as cited in the aforesaid description have known equivalents, such equivalents are also included here in the present disclosure.

LIST OF REFERENCE SIGNS 1 spool
11 end
12 end
13 mounting hole
2 locking disk
21 flange
22 sleeve
221 engaging section
222 cutting section
223 separating section
224 stopping surface
23 positioning slot
3 torsion bar
4 clip
5 load limiting ring
51 thread
52 slider
100 load limiting device
200 load limiting device
300 load limiting device
400 load limiting device

What is claimed is:

1. A safety belt retractor with a load limiting device, wherein:
the load limiting device comprises: a hollow spool (1) around which a webbing can be wound, a locking disk (2) having a flange (21) and a sleeve (22) fixed thereto, and a torsion bar (3);
the locking disk (2) can be mounted with the flange (21) on one end of the spool (1) and can extend with the sleeve (22) into a hollow chamber of the spool (1), and the spool (1) is rotatable in relation to the locking disk (2);

the torsion bar (3) can be arranged in the hollow chamber of the spool (1) and is fixed both on the spool (1) and on the locking disk (2) in a rotationally secured manner;

the load limiting device further comprises a load limiting ring (5) with a thread (51) on the inner circumference, which load limiting ring (5) can be rotated around the sleeve (22) with the rotation of the spool (1), and the sleeve (22) is provided on its outer circumference with an engaging section (221) and with a resistance part comprising a cutting section (222) for applying a resistance to the load limiting ring (5), wherein the sleeve (22) has in the engaging section (221) a mating thread which matches with the thread (51) of the load limiting ring (5) and in the cutting section (222) has an outer diameter that is larger than the nominal diameter of the thread (51) of the load limiting ring (5), and the resistance part is arranged downstream of the engaging section (221) in the axial displacement direction of the load limiting ring (5).

2. A safety belt retractor according to claim 1, wherein the sleeve (22) has a guiding thread in the cutting section (222), through which guiding thread the load limiting ring (5) can be guided.

3. A safety belt retractor according to claim 1 wherein the sleeve (22) is provided on its outer circumference with a stopping surface (224), which stopping surface is formed by a step made on the sleeve (22) and is arranged downstream of the cutting section (222) in the axial displacement direction of the load limiting ring (5).

4. A safety belt retractor according to claim 1, wherein the sleeve (22) is provided on its outer circumference with a separating section (223), which separating section is arranged directly downstream of the cutting section (222) in the axial displacement direction of the load limiting ring (5), and in that the outer diameter of the sleeve (22) in the separating section (223) is no larger than the nominal diameter of the thread (51) of the load limiting ring (5).

5. A safety belt retractor according to claim 1, wherein the sleeve (22) is provided on its outer circumference with a stopping surface (224) as a second resistance part, which stopping surface is formed by a step made on the sleeve (22).

6. A safety belt retractor according to claim 1, wherein the thread of the load limiting ring (5) extends in a discontinuous manner in the circumferential direction and thereby forms at least one threaded section, and in that the thread of the load limiting ring (5) is divided into a plurality of threaded sections in an equally spaced manner in the circumferential direction.

7. A safety belt retractor according to claim 1, wherein the flange (21) of the locking disk (2) and the sleeve (22) are integrated.

8. A safety belt retractor according to claim 1, wherein the safety belt retractor further comprises a safety belt tensioner.

9. A vehicle, which comprises a safety belt retractor according to claim 1.

10. A safety belt retractor with a load limiting device, wherein:

the load limiting device comprises: a hollow spool (1) around which a webbing can be wound, a locking disk (2) having a flange (21) and a sleeve (22) fixed thereto, and a torsion bar (3);

the locking disk (2) can be mounted with the flange (21) on one end of the spool (1) and can extend with the sleeve (22) into a hollow chamber of the spool (1), and the spool (1) is rotatable in relation to the locking disk (2);

the torsion bar (3) can be arranged in the hollow chamber of the spool (1) and is fixed both on the spool (1) and on the locking disk (2) in a rotationally secured manner;

the load limiting device further comprises a load limiting ring (5) with a thread (51) on the inner circumference, which load limiting ring (5) can be rotated around the sleeve (22) with the rotation of the spool (1), and the sleeve (22) is provided on its outer circumference with an engaging section (221) and with a resistance part for applying a resistance to the load limiting ring (5), wherein the sleeve (22) has in the engaging section (221) a mating thread which matches with the thread (51) of the load limiting ring (5), and the resistance part is arranged downstream of the engaging section (221) in the axial displacement direction of the load limiting ring (5), wherein a slider extending in the axial direction is provided on the outer circumference of the load limiting ring (5), and in that a sliding slot extending in the axial direction is provided on the inner side of the spool (1), so as to mate with the slider, and thereby the load limiting ring (5) can be displaced in relation to the spool (1) in the axial direction, while being mounted on the spool (1) in a rotationally secured manner.

11. A safety belt retractor with a load limiting device, wherein:

the load limiting device comprises: a hollow spool (1) around which a webbing can be wound, a locking disk (2) having a flange (21) and a sleeve (22) fixed thereto, and a torsion bar (3);

the locking disk (2) can be mounted with the flange (21) on one end of the spool (1) and can extend with the sleeve (22) into a hollow chamber of the spool (1), and the spool (1) is rotatable in relation to the locking disk (2);

the torsion bar (3) can be arranged in the hollow chamber of the spool (1) and is fixed both on the spool (1) and on the locking disk (2) in a rotationally secured manner;

the load limiting device further comprises a load limiting ring (5) with a thread (51) on the inner circumference, which load limiting ring (5) can be rotated around the sleeve (22) with the rotation of the spool (1), and the sleeve (22) is provided on its outer circumference with an engaging section (221) and with a resistance part for applying a resistance to the load limiting ring (5), wherein the sleeve (22) has in the engaging section (221) a mating thread which matches with the thread (51) of the load limiting ring (5), and the resistance part is arranged downstream of the engaging section (221) in the axial displacement direction of the load limiting ring (5), wherein the load limiting device further comprises a clip (4) for preventing the spool (1) from bouncing axially in relation to the locking disk (2).

12. A safety belt retractor according to claim 10, wherein the clip (4) is positioned in the assembled state between the spool (1) and the locking disk (2) by means of a mounting hole (23) in the spool (1) and a positioning slot on the locking disk (2).

* * * * *

UNITED STATES PATENT AND TRADEMARK OFFICE
CERTIFICATE OF CORRECTION

| | | |
|---|---|---|
| PATENT NO. | : 11,014,530 B2 | Page 1 of 1 |
| APPLICATION NO. | : 16/083937 | |
| DATED | : September 11, 2018 | |
| INVENTOR(S) | : Yong Han | |

It is certified that error appears in the above-identified patent and that said Letters Patent is hereby corrected as shown below:

On the Title Page

Item (71) of the Applicant, please change the Applicant Name to -- ZF ASIA PACIFIC AUTOMOTIVE SAFETY SYSTEMS (SHANGHAI) CO. --.

Signed and Sealed this
Twenty-fourth Day of June, 2025

Coke Morgan Stewart
*Acting Director of the United States Patent and Trademark Office*